United States Patent [19]

Lockard

[11] Patent Number: 4,837,896
[45] Date of Patent: Jun. 13, 1989

[54] CONTROL LINKAGE FOR SAUSAGE STUFFING MECHANISM ON SAUSAGE STUFFING MACHINE

[75] Inventor: Thomas A. Lockard, Detroit, Mich.
[73] Assignee: Koch Supplies, Inc., Kansas City, Mo.
[21] Appl. No.: 128,612
[22] Filed: Dec. 4, 1987
[51] Int. Cl.⁴ .............................................. A22C 11/02
[52] U.S. Cl. ............................................. 17/35; 17/41
[58] Field of Search .......................... 17/33, 49, 41, 35

[56] References Cited
U.S. PATENT DOCUMENTS
4,744,129  5/1988  Weerth ............................... 17/41 X

*Primary Examiner*—Willie G. Abercrombie
*Attorney, Agent, or Firm*—Kokjer, Kircher, Bradley, Wharton, Bowman & Johnson

[57] ABSTRACT

The stuffing machine has a casing brake ring which cooperates with the tip of the filling tube to exert a drag on the gathered casing drawn off the filling tube during filling of the casing. The brake ring is carried by a movable support which is mounted to the machine by a mechanism which includes a control linkage. The linkage includes a variable length link rod connecting the brake ring support with the machine. The length of the link which determines the operating position of the brake ring relative to the filling tube is controlled by a hand operated rotary adjusting device interposed in the link. The link is also connected with a crank arm which cooperates with the link through an overcenter arrangement to lock the brake ring support in the operating position for the brake ring. The crank arm and link can also be used to displace the brake ring support to a position remote from the filling tube to permit access to the tube for loading of fresh casing.

6 Claims, 2 Drawing Sheets

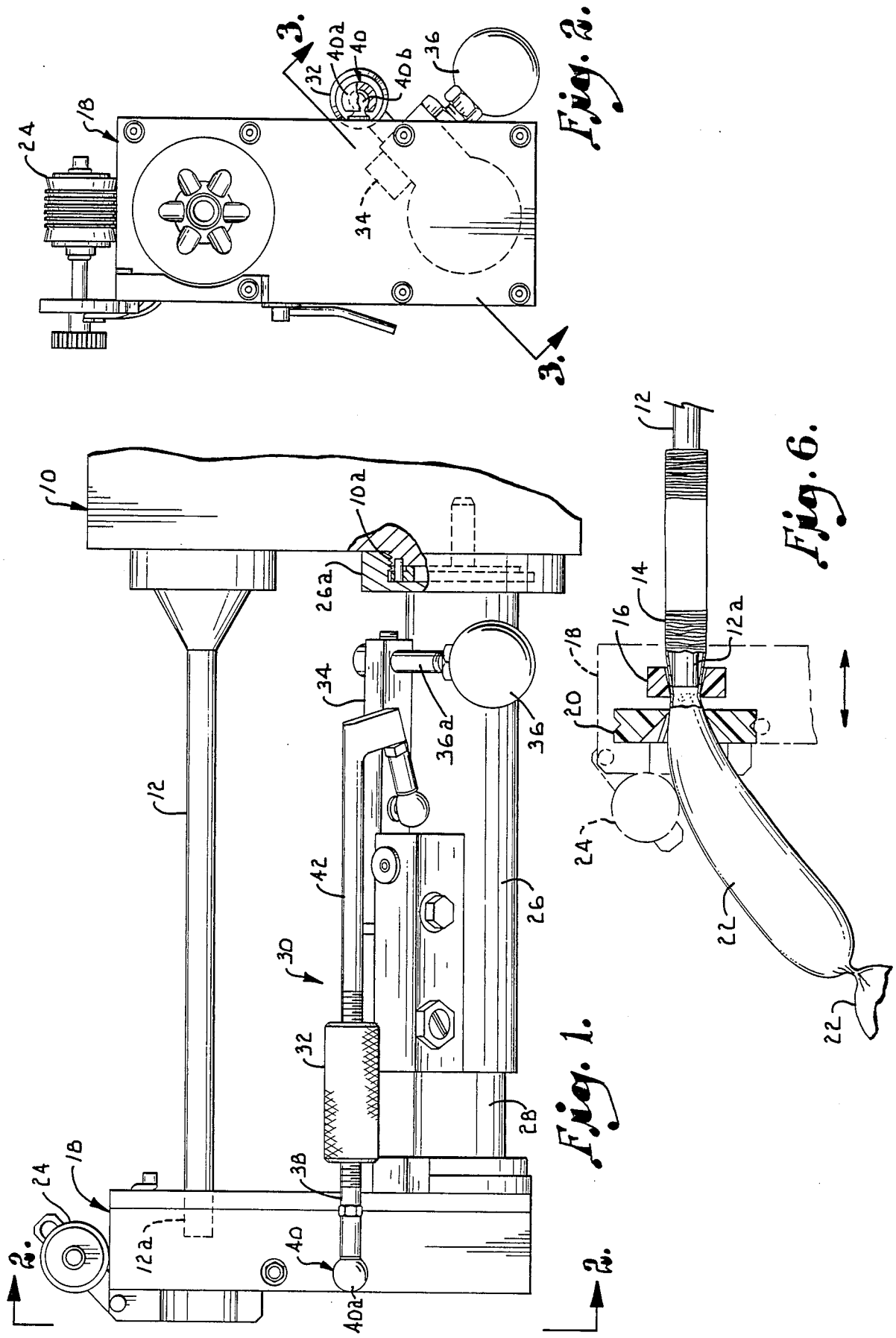

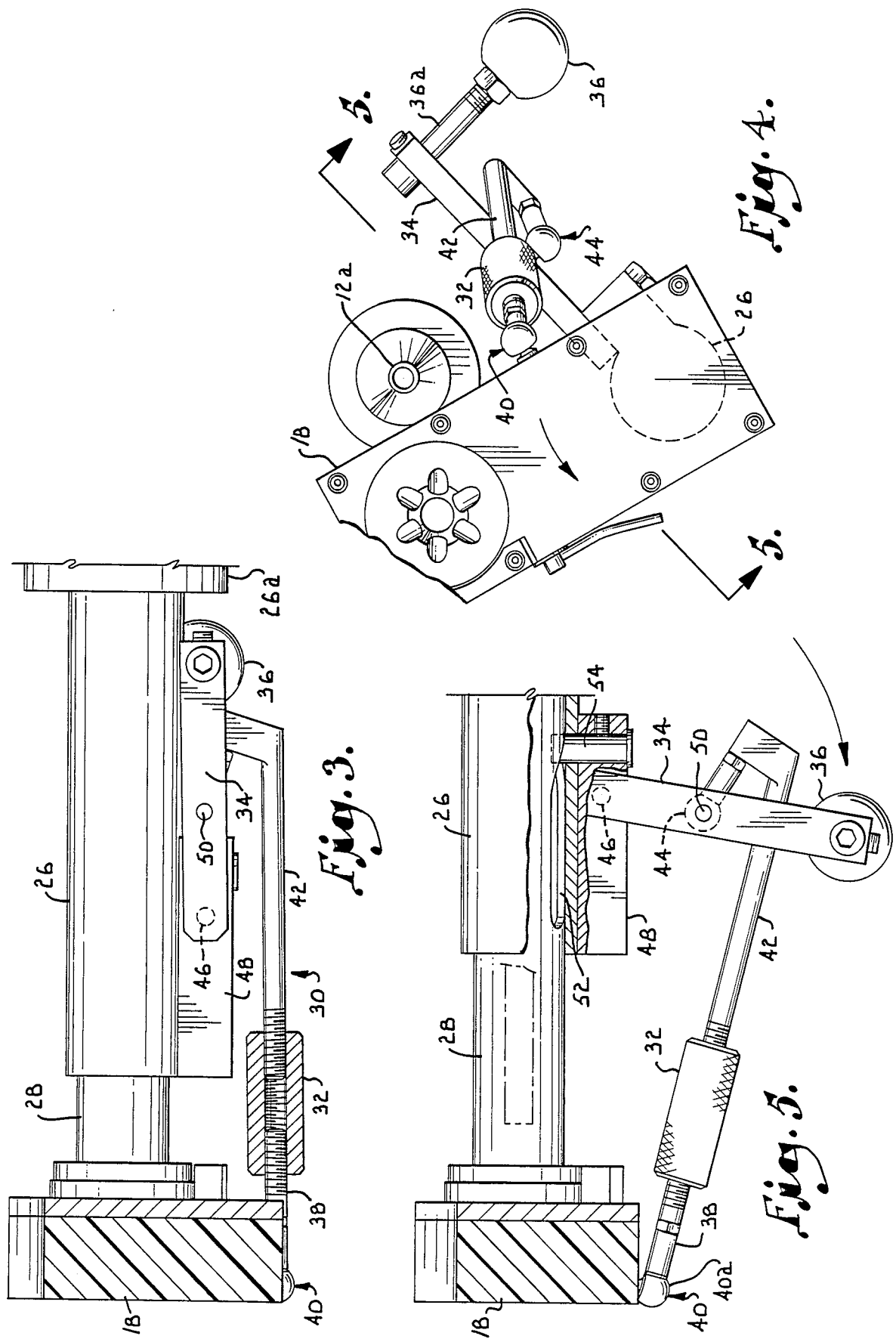

CONTROL LINKAGE FOR SAUSAGE STUFFING MECHANISM ON SAUSAGE STUFFING MACHINE

FIELD OF THE INVENTION

This invention relates in general to sausage making equipment and deals more particularly with an improved means for controlling the forces applied to casing material during filling of the casing and for facilitating access to the filling tube for installation of casing material and other purposes.

BACKGROUND OF THE INVENTION

In sausage stuffing machines of the type to which this invention is directed, the sausage is formed by extruding sausage meat into a casing. The sausage is guided into the casing by a filling tube, over the outside of which a gathered sleeve of a casing material is mounted. As the sausage emerges from the end of the tube, it engages a closed casing wall and thereby draws the casing material off the end of the tube. It is important to control the diameter of the sausage by applying more or less resistance to the movement of the casing material as it comes off the tube. This has been done by use of a casing braking ring which is located adjacent the tip of the tube and by controlling the annular gap between the ring surface and tip to increase or decrease the braking pressure on the casing material.

In machines known to the prior art, the adjustment arrangement has been difficult to easily achieve and reliably maintain. The components which require manual manipulation are heavy and require extensive material and machining to produce. They are also difficult to manually adjust and difficult for ordinary workers to comprehend and operate satisfactorily.

SUMMARY OF THE INVENTION

This invention provides an improved mechanism for easily positioning the braking ring and other link forming components in operative and nonoperative positions relative to the filling tube of a sausage stuffing machine. The objects of the invention are achieved, in part, through provision of a relatively lightweight and simply componented adjusting mechanism which effects quick and easy transition of the position of the braking ring support element between operative and nonoperative conditions, and which is so designed that once in the operative condition, there is only one easy adjustment that need be made to control the braking action on the casing material. The adjusting element is conveniently located and properly sized so as to permit those with average manual strength and dexterity to make very fine adjustments to control the braking action on the casing material. The adjustment is made directly to the braking ring support device, and it is indexed against a stationary fixed reference which is not capable of slippage out of its proper reference condition. Upon return to the operative condition, the brake device is referenced against an automatically locked component which does not require, for the locking action, any action on the part of the operator other than to observe that the mechanism is in its automatic locked condition.

It is a further feature of the invention that despite the fine adjustment capabilities which the invention provides, it also permits quick and easy transition of the brake ring support to a position in which it is offset from and free of interference with the filling tube.

Other objects and features of the invention together with features of novelty pertinent thereto will appear in the course of the following description.

DETAILED DESCRIPTION OF THE DRAWINGS

In the accompanying drawings, which form a part of the specification and are to be read in conjunction therewith, and in which like reference numerals indicate like parts in the various views:

FIG. 1 is a side elevational view, partially schematic, of the preferred casing stuffing apparatus embodying my invention, parts being broken away and shown in section for purposes of illustration;

FIG. 2 is an end elevational view of same, taken generally along line 2—2 of FIG. 1 in the direction of the arrows;

FIG. 3 is an inverted sectional view of same, taken along line 3—3 of FIG. 2 in the direction of the arrows;

FIG. 4 is an end elevational view of same, similar to FIG. 2 but showing the braking ring support in its extended and displaced condition permitting access to the tip of the filling tube, parts being broken away for purposes of illustration;

FIG. 5 is an inverted sectional view of same, taken along line 5—5 of FIG. 4 in the direction of the arrows; and FIG. 6 is a fragmentary schematic view, illustrating the stuffing and formation of a typical sausage.

Referring to the drawings, reference numeral 10 indicates a portion of the body of a sausage stuffing machine, the outlet of which comprises the hollow discharge tube 12 extending outwardly from the stuffing machine. As is known in the art, the stuffing machine receives the sausage meat or other pastry or doughy material and is equipped with apparatus for effecting discharge of the material in controlled increments through tube 12, which is also known as a filling tube.

As shown in FIG. 6, tube 12, when operating to stuff sausage casing, carries on its exterior a longitudinally gathered sleeve of tube-like sausage casing material 14. Sausage discharged from the tip 12a of the tube as it fills the casing draws the casing off the end of the filling tube. The resistance offered by the casing material against the extruded sausage meat can be varied by adjusting the longitudinal position of a braking ring 16 relative to the tip 12a of the filling tube. The braking ring has a tapered opening into which the tip extends. The ring is carried by a support 18, which as will be seen, can be displaced by fine adjustment longitudinally relative to the filling tube.

The support 18 also carries a rotatably twisting or linking ring 20 which operates to form the extruded casing and sausage into links as illustrated at 22. In addition, it supports a deflector roll 24.

The apparatus and method of operation as thus far described are typical of automatic sausage making equipment and the details do not form a part of my invention and will not be further described.

Turning back now to FIGS. 1 through 5, the support 18 for the braking and twisting rings is mounted in cantilever fashion from the side of stuffer 10 by an assembly which includes the stationary outer horizontal sleeve 26 and an inner sleeve 28 which is telescopically received within and supported by the outer sleeve. The outer sleeve 26 is secured to the stuffer 10 by a threaded collar 26a which engages a boss 10a on the stuffer. The inner sleeve 28 rigidly connects at its outer end with and supports the braking ring support 18.

The longitudinal position of the braking ring support 18 relative to filling tube 12 is controlled by means of a link mechanism which includes a connecting rod assembly 30, the length of which can be finely adjusted by rotation of a turnbuckle-like adjusting barrel 32, and a crank arm 34, which is manipulated manually by means of the hand knob 36.

The adjusting barrel 32 of the connecting rod assembly is threadably connected at its outer end with one end of a link member 38. The other end of member 38 is connected to one side of the braking ring support 18 by means of a universal joint 40 having a semi-spherical socket member 40a on the link and a ball 40b on the support 18 (see FIG. 2). A second link member 42 extends from a threaded connection with barrel 32 toward the stuffer and is connected with crank arm 34 by a universal joint 44 like joint 40 earlier described. The threading at opposite ends of the barrel is reversed, so that rotation of the barrel in one direction in effect shortens the link assembly and in the other direction lengthens it.

As can best be seen in FIG. 3, in the operative position of the stuffer assembly, i.e., the sausage making position, crank arm 34 is pivotally connected by pivot pin 46 to the side of a rib 48 which is secured to and extends outwardly from the outer sleeve 26. Link member 42 is connected to the crank arm 34 at a point located between the crank pivot 46 and the connection of the hand knob 36 with the crank arm. The pivot axis for link 42 relative the crank arm is shown at 50. The arrangement is such that pivot axis 50 is offset inwardly toward sleeve 56 from a plane parallel to the axis of sleeve 56 and including the pivot axis for crank arm 34 when the free end of the crank arm is abutting the sleeve 26. The consequence is that the crank arm has a built-in "over-center" lock which locks it into the operative position for the braking ring and prevents rotation of the crank through longitudinal forces applied to the link assembly during operation.

The over-center lock serves to ensure that the adjusting barrel 32 is the only means by which the position of the braking ring 16 relative to the tip 12a of the filling tube can be adjusted for the purposes described earlier. The link member 42 is so constructed that force applied through it to crank arm 34 during sausage making is such as to tend to rotate the crank arm about its pivot 46 toward sleeve 26. This is taken up however, by the engagement of the crank arm with the sleeve with the result that link member 42 provides a stationary index location for relative movement of the braking ring inwardly or outwardly with respect to the tip of the tube in response to rotation of adjusting barrel 32. Because of its relatively small diameter and convenient location, manual operation of the adjusting barrel is easily accomplished and great strength is not required.

Another important operative feature of the link assembly is that it provides an easily operated mechanism capable of shifting the braking ring support 18 to a leftward displaced position from the operating position illustrated in FIGS. 1, 2 and 3. In the displaced position, in which the support 18 is located well beyond the tip 12a of the filling tube, the support 18 has also been rotated to move it to one side of the axis of the filling tube which is the position shown in FIG. 4.

The longitudinal movement of the support 18 is the result of the initial rotation of crank arm 34 about its pivot 46 away from sleeve 26. This is effected by grasping hand knob 36 and pulling outwardly. It will be observed that hand knob 36 is spaced well away from both crank arm 34 and sleeve 26 by mounting it on a post 36a which is secured to and extends from the crank arm. The hand knob is thus positioned for ready accessibility and ease of movement. Outward pivoting of the crank arm results in extension of inner sleeve 28 relative to the stationary sleeve 26 and thus displacement of the braking ring support 28. The initial movement of the inner sleeve 28 is axial only. This is because the inner sleeve is keyed to the outer sleeve by a spline connection illustrated in FIG. 5 in the form of a longitudinal camming groove 52 formed in the exterior wall of the inner sleeve 28 which cooperates with the end of a pin 54 extending into the groove. The initial portion of groove 54 is as indicated, parallel with the axis of tube 28. However, the groove continues with a spiral offset which in cooperation with the pin, effects rotation of the inner sleeve 28, and thus the rotation of the support 18 to the position illustrated in FIGS. 4 and 5. Of course, reverse movement of the hand crank 34 reverses the sequence of movement and returns the support 18 to the operative position for the braking ring relative to the filling tube.

From the foregoing, it will be seen that this invention is one well adapted to attain all of the ends and objects hereinabove set forth together with other objects and advantages which are inherent to the structure.

It will be understood that certain features and subcombinations are of utility and may be employed without reference to other features and subcombinations.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A sausage stuffing machine having a casing filling tube with a discharge tip and a casing brake ring adjacent said tip, the combination therewith of
   a casing brake ring support,
   means mounting said support to permit movement thereof and of said brake ring axially relative to said tip, said means including a fixed member connected with said machine and a movable member supported by said fixed member and carrying said support,
   an external link assembly interconnecting said fixed member with said support and operable to cause movement of said moveable member relative said fixed member, said assembly including a link rod having one end pivotally connected with said support and a crank arm pivotally connected to said fixed member, said link rod having another end connected with said crank arm, said link rod operable in response to pivotal movement of said crank arm to move said support and casing brake ring relative to said discharge tip,
   said link assembly further including manually adjustable means for shortening and lengthening said link rod whereby to effect movement of said support and brake ring independently of movement of said crank means.

2. The combination as in claim 1, wherein said manually adjustable means comprises an internally threaded adjusting device cooperating with a threaded member inserted therein.

3. The combination as in claim 1,
said crank arm movable between a first position in which said support and brake ring are in operative relationship with said discharge tip and a second position in which said support and brake ring are remote from said tip, and
means operable upon movement of said crank arm into said first position to automatically resist further movement of said crank arm in any direction in response to longitudinal forces imposed on said link assembly.

4. The combination as in claim 3,
said last named means including an over-center relationship between the connection of said link rod with said crank arm and the pivotal connection of said crank arm with said fixed member.

5. The combination as in claim 1, said means mounting said support permitting both axial and rotational movement of said support whereby said support can be shifted by said link assembly to a position in which no portion of said support is intercepted by an extension of the axis of said filling tube.

6. The combination as in claim 1, including
a hand knob secured to said crank arm and offset laterally from said means mounting said support and said link rod.

* * * * *